(12) United States Patent
Komrakov

(10) Patent No.: US 9,667,305 B2
(45) Date of Patent: May 30, 2017

(54) RECEIVER-TRANSMITTER

(71) Applicant: Quantrill Estate Inc., Road Town, Tortola (VG)

(72) Inventor: Evgeny Vyacheslavovich Komrakov, Sankt-Peterburg (RU)

(*) Notice: Subject to any disclaimer, the term of this patent is extended or adjusted under 35 U.S.C. 154(b) by 0 days.

(21) Appl. No.: 14/441,659

(22) PCT Filed: Dec. 18, 2013

(86) PCT No.: PCT/RU2013/001133
§ 371 (c)(1),
(2) Date: May 8, 2015

(87) PCT Pub. No.: WO2015/084208
PCT Pub. Date: Jun. 11, 2015

(65) Prior Publication Data
US 2016/0049987 A1 Feb. 18, 2016

(30) Foreign Application Priority Data

Dec. 6, 2013 (RU) .................................. 2013154269

(51) Int. Cl.
*H01Q 3/34* (2006.01)
*H04B 1/50* (2006.01)
*H01Q 21/06* (2006.01)
*H01Q 21/20* (2006.01)
*H01Q 25/00* (2006.01)
(Continued)

(52) U.S. Cl.
CPC ................ *H04B 1/50* (2013.01); *G01S 7/032* (2013.01); *H01Q 1/523* (2013.01); *H01Q 3/34* (2013.01); *H01Q 21/0025* (2013.01); *H01Q 21/061* (2013.01); *H01Q 21/205* (2013.01); *H01Q 25/005* (2013.01); *G01S 2013/0254* (2013.01); *H01Q 3/26* (2013.01)

(58) Field of Classification Search
CPC ............. H04B 1/50; H01Q 3/34; H01Q 1/523
See application file for complete search history.

(56) References Cited

U.S. PATENT DOCUMENTS 4,766,438 A * 8/1988 Tang ........................ H01Q 3/24
342/372
4,791,421 A * 12/1988 Morse ................ H01Q 21/0025
342/368

(Continued)

*Primary Examiner* — Jean B Corrielus
(74) *Attorney, Agent, or Firm* — Paul & Paul

(57) ABSTRACT

A receiver-transmitter includes active two-face phased arrays comprising transmit-receive modules. Each module includes two radiating elements, a transmitter, two receivers, two isolator switches, mixers and a phase shifter. The two-face phased arrays are either unidimensional or two-dimensional. The arrays are arranged in the horizontal plane at an angle of 75-105° to each other while keeping the capability of all-around looking. The transmit-receive module is provided with an additional phase shifter. Each phase shifter can be permanently connected, via a selector switch, to one of the receivers or to the transmitter, and the transmitter is connected, via a switch and circulators, to the radiating elements. Alternatively, each phase shifter can be connected to the radiating elements with the use of different frequencies and/or with the use of a different signal coding, corresponding to different frequencies and coding of the receivers receiving mode.

6 Claims, 8 Drawing Sheets

(51) Int. Cl.
  *H01Q 1/52*   (2006.01)
  *H01Q 21/00*  (2006.01)
  *G01S 7/03*   (2006.01)
  *H01Q 3/26*   (2006.01)
  *G01S 13/02*  (2006.01)

(56) References Cited

U.S. PATENT DOCUMENTS

| | | | | |
|---|---|---|---|---|
| 5,027,125 | A * | 6/1991 | Tang | H01Q 3/34 |
| | | | | 342/368 |
| 5,283,587 | A * | 2/1994 | Hirshfield | H01Q 21/064 |
| | | | | 342/361 |
| 2010/0260076 | A1 * | 10/2010 | Corman | H01Q 3/26 |
| | | | | 370/277 |
| 2015/0011168 | A1 * | 1/2015 | Chen | H01P 1/36 |
| | | | | 455/73 |

\* cited by examiner

RECEIVER-TRANSMITTER

FIELD OF THE INVENTION

The present invention relates to the technology of active phased arrays (APA) and can find a wide application to build radar stations for mobile or stationary objects as well as in communication systems.

BACKGROUND OF THE INVENTION

The prior art describes various devices based on the APA technology.

The closest to the claimed device as to the combination of essential features is the arrangement of a two-face phased array according to the U.S. Pat. No. 3,648,284 A published on Jul. 3, 1972 and comprising two-dimensional two-face phased arrays consisting of transmit-receive modules (TRM), with the capability to commutate to two radiating elements with one transmitter and two receivers that simultaneously radiate and receive in opposite directions.

Drawbacks of said technical solution are the need to use three two-face phased arrays to provide all-around looking which rises in the cost of the radar system, a low scanning rate which results in a wide blind area in the upper part of the hemisphere, the impossibility to form fully independent beams in opposite directions due to the use of a unique phase shifter in a TRM which significantly decreases the energy potential and the capability of use in radar systems and practically completely prevents their use in communications systems, the absence of capability to use different signal coding in opposite directions which reduces noise immunity in case of simultaneous transmitting and receiving, low efficiency of communications systems due to the use of only two-dimensional arrays, difficulty of mounting and presence of shaded sectors due to the lack of two-side arrays shift with regard to each other in the horizontal and/or vertical plane.

SUMMARY OF THE INVENTION

The technical result obtained with the use of the present invention consists in the increase of energy potential and of efficiency as well as in the cost reduction of a radar system or of a communications system while providing all-around looking, in the increase of the scanning area in the vertical plane, in the provision of the capability to form fully independent beams in opposite directions and in the absence of shaded sectors.

The technical result obtained with the use of the present invention consists in the increase of the receiver-transmitter energy potential and of efficiency due to the formation of at least two independent beams in opposite directions with the use of an additional phase shifter in the TRM, in the reduced cost of the device due to the use of only two two-sided APAs, in the elimination of any blind looking area of the device in the upper and/or lower hemisphere resulting from the use of additional one-sided or two-sided APAs or due to the fact that the panels of each face of a two-face active phased array are mounted at an angle to each other in the vertical plane, in the additional increase of noise immunity resulting from the use of a different signal coding while transmitting to different directions, in the commodity of the APAs location and in the elimination of shaded sectors due to the shift of the APAs in relation to each other in the vertical and/or horizontal plane.

Said technical result is obtained by the fact that in a receiver-transmitter containing active two-face phased arrays comprising transmit-receive modules each one of them including two radiating elements, a transmitter, two receivers, two isolator switches, mixers and a phase shifter, the two-face phased arrays are made unidimensional or two-dimensional, they are arranged in the horizontal plane at an angle of 75-105° to each other while keeping the capability of all-around looking, the transmit-receive module is provided with an additional phase shifter, each one of both phase shifters being permanently connected, via a selector switch, to one of the receivers or to the transmitter, and the transmitter is connected, via a selector switch and a circulator, to the radiating elements with the possibility to be alternately connected to the radiating elements with the use of different frequencies and/or with the use of a different signal coding, corresponding to different frequencies and coding of the receivers receiving mode with the capability to form at least two independent beams in opposite directions, the active two-side phased arrays being shifted relative to each other in the horizontal and/or vertical plane.

Said technical result is obtained as well by the fact that the panels of each side of the active two-side phased array can be arranged at an angle to each other in the vertical plane. Besides, the receiver-transmitter can be additionally provided with at least one radar or communication station located above and/or below the receiver-transmitter, made with the capability to scan in two planes in order to radiate upwards and/or downwards. In this instance, the radar or communication station can be made as a two-dimensional active one-side phased array or as a two-dimensional active two-side phased array with transmit-receive modules described in claim 1, arranged with a shift relative to the receiver-transmitter in the horizontal and vertical planes.

BRIEF DESCRIPTION OF THE DRAWINGS

The essence of the invention is illustrated by the accompanying drawings, in which.

EMBODIMENTS OF THE INVENTION

In the last decades, the use of APAs in radar and communications systems has become very widespread. However, the costs of TRMs are still rather high. At the same time, the TRM size goes down thanks to the modern high-frequency integrated-circuit technologies such as the Monolithic Microwave Integrated Circuit (MMIC). The reduced size of TRMs enables to easily build devices according to the present invention.

A traditional solution to build a radar or communications system, when the all-around looking is required, lies in the use of four APAs each one of them carrying out ±45-60° scanning in the horizontal and vertical planes. Consequently, to provide a relatively narrow pattern, for example 2° in any range, each APA will comprise more than 3000 APAs. In the case of four APAs, more than 12,000 APAs are required which enables to form four fully independent beams. Such radar is rather expensive. The device according to the claimed invention, when keeping its energy potential and four independent beams, enables to reduce the cost of such radar, since about 80% of the cost relates to the TRM modules, the cost of an additional receiver and of a phase shifter being not high.

Figure 1:
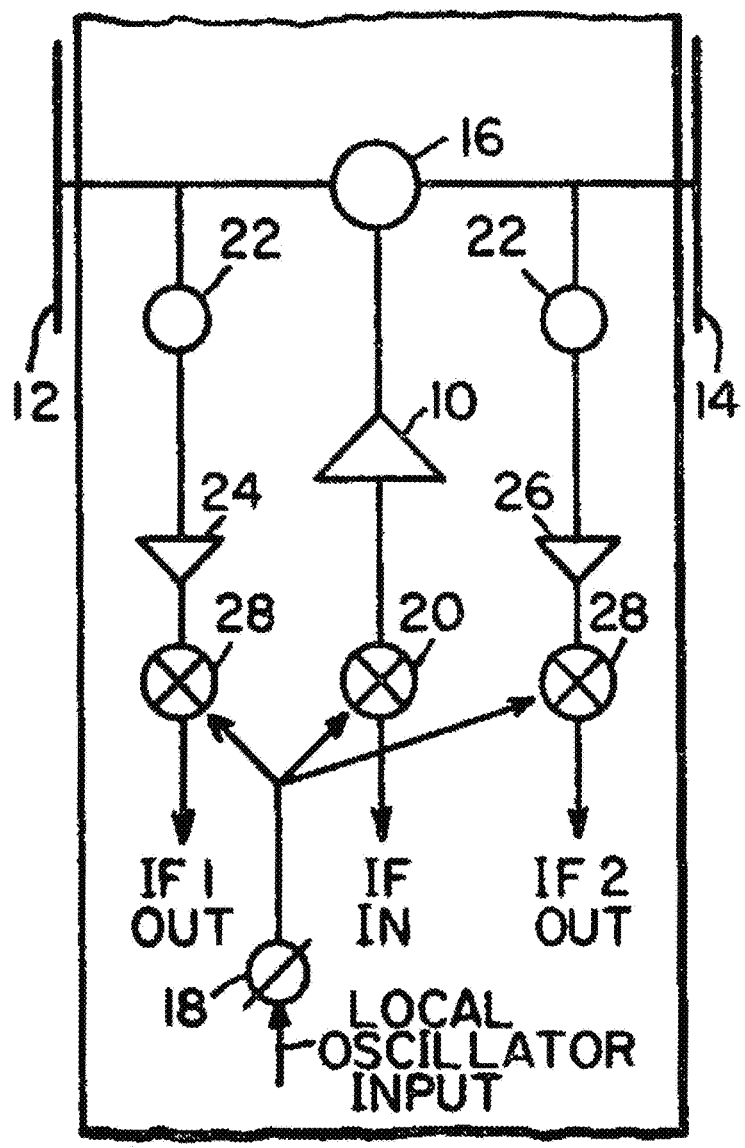
FIG. 1 schematically shows a TRM from the closest prior art in the U.S. Pat. No. 3,648,284.

FIG. 1 shows an arrangement disclosed in the U.S. Pat. No. 3,648,284 where 10 represents a transmitter, 12 and 14 are radiating elements, 16 is a selector switch, 18 is a phase shifter, 20 and 28 are mixers, 24 and 26 are receivers. It enables a two times reduction of the number of TRMs compared to radar systems using one-face phased arrays, but the energy potential will be lower than for the case of two independent one-side phased arrays. Due to the use of only one phase shifter for different directions, emission and reception of a signal with the same phase will occur, which does not enable to form completely independent beams.

Figure 2:
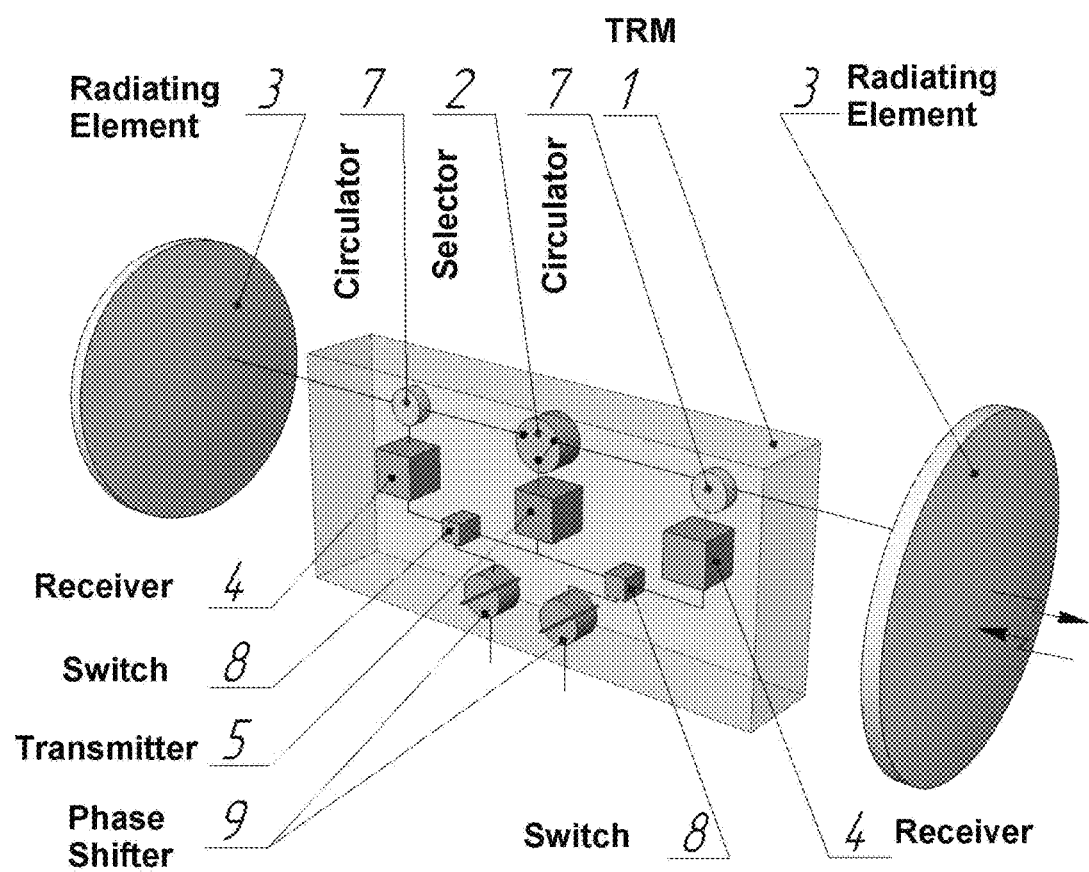
FIG. 2 shows a general view of the claimed TRM construction, with two radiating elements having a selector switch for the transmitting channel, with two independent receivers and two independent phase shifters, where 1 represents a TRM, 2 represents a selector switch, 3 represents radiating elements, 4 represents receivers, 5 represents a transmitter, 7 represents a circulator, 8 represents a switch of reception-transmission, 9 represents phase shifters.

FIG. 2 shows an arrangement where 1 represents a TRM, 2 is a switch, 3 represents a radiating element, 4 is a receiver, 5 is a transmitter, 7 represents a circulator, 8 represents a transmit-receipt selector switch, 9 represents phase shifters. Such an arrangement enables to simultaneously emit and to receive, thanks to the use of two independent phase shifters, signals of different directions and with different phases, and, consequently, enables to form completely independent beams on opposite APA panels, without loss of energy potential.

Figure 3:
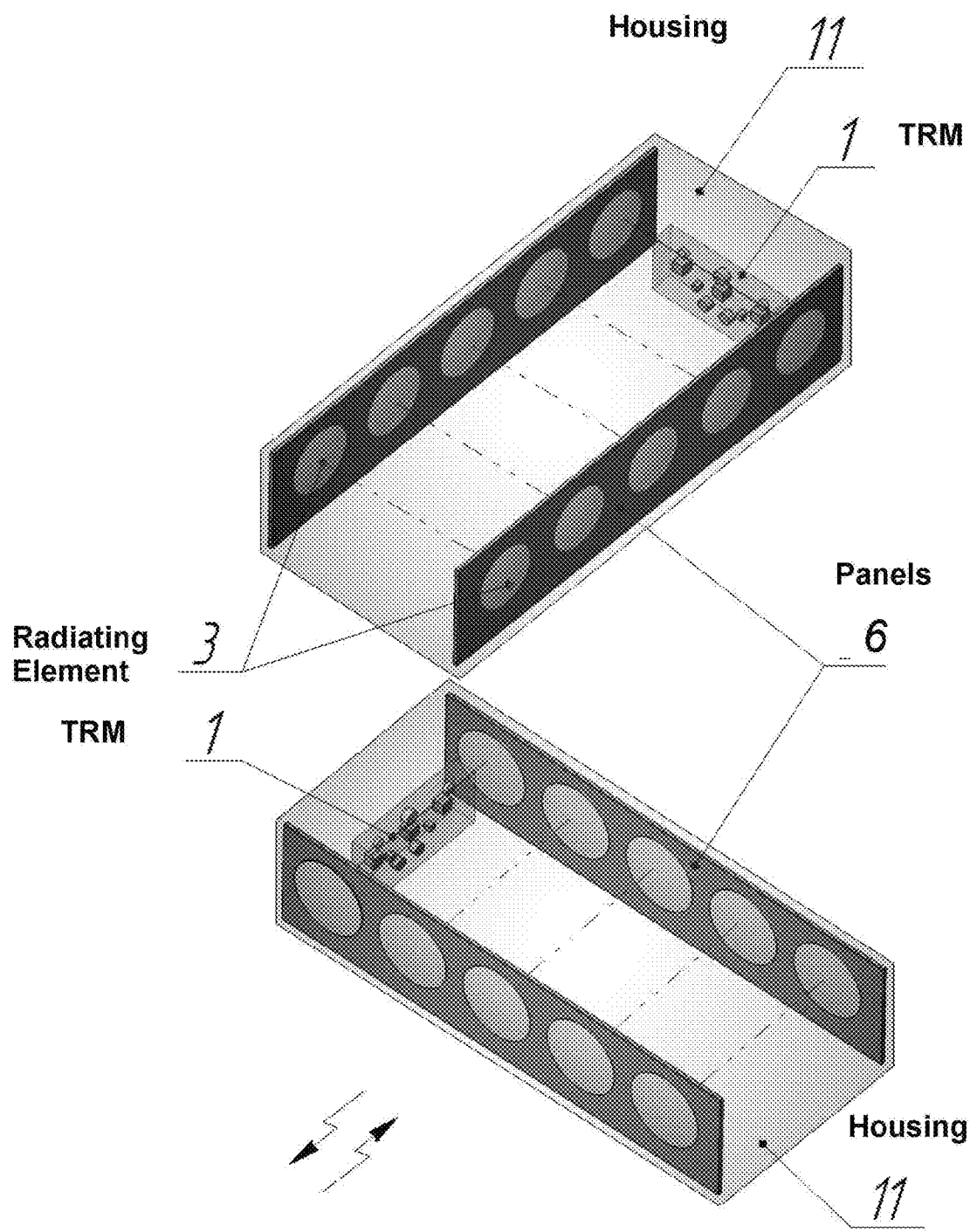
FIG. 3 shows a general view of two unidimensional APAs which provide for 360° scanning in the horizontal plane, where 1 represents a TRM, 3 represents radiating elements, 6 represents APAs panels, 11 represents a housing.
Figure 4:
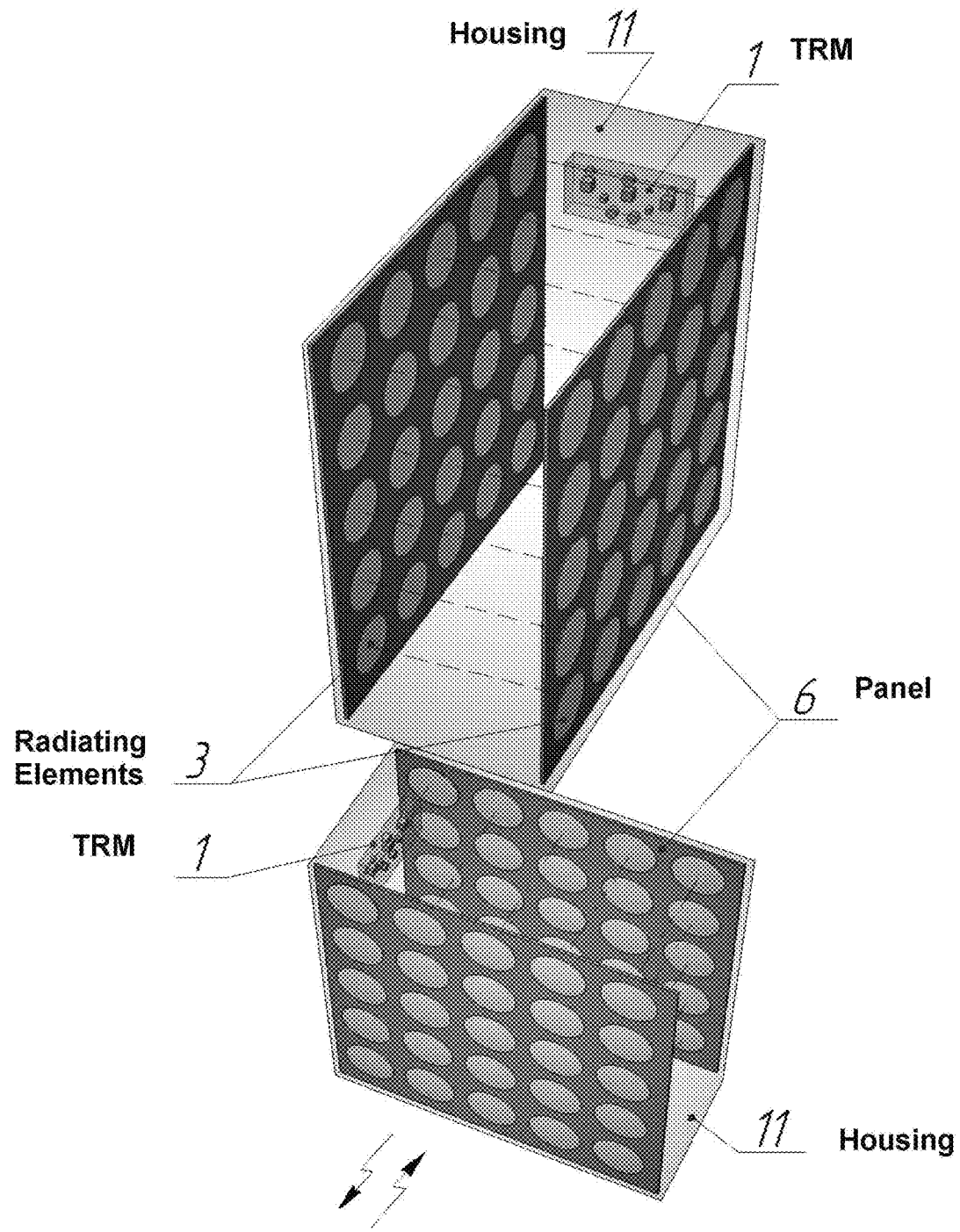
FIG. 4 shows a general view of two two-dimensional APAs which provide for all-around 360° scanning in the horizontal plane and for ±45-60° scanning in the vertical plane, where 1 represents a TRM, 3 represents radiating elements, 6 represents APAs panels, 11 represents a housing.

FIG. 3 shows a radar or communications system composed of two unidimensional two-sided APAs mounted in an orthogonal way and comprising TRMs illustrated in FIG. 2, that are operating in opposite directions. Such an arrangement enables every array panel to scan ±45-60° with independent electronic beams in the horizontal plane in opposite directions, at the same time providing the all-around looking. Arranging 2 two-dimensional APAs in the orthogonal plane to each other enables the all-around looking in the horizontal plane and ±45-60° in the vertical plane with the help of independent beams from each APA panel (FIG. 4). Such an arrangement provides for the possibility of the all-around looking, for maintaining the energy potential and the formation of independent beams while using 6,000 TRMs instead of 12,000. To prevent the formation of shaded sectors, unidimensional or two-dimensional two-faced APAs are mounted with some shift relative to each other in the vertical and/or horizontal planes with the possibility to take account of parallax mathematically.

If the radar with a traditional all-around looking APA has 12,000 TRMs of 1 W power and the on-off time ratio of 10 (operation time of 10%), its average power will be 1,200 W. While using the device according to the present invention for providing the all-around looking, only 6,000 TRMs of 1 W are required, but they will operate already for 20% of time, the average power of the whole system being equal to 1,000 watts as well.

In the case of using a TRM with an arrangement according to the present invention (FIG. 2), the transmitting channel operates as well via a selector switch for two radiating elements, the receiving independent channels (4) being permanently connected to both radiating elements. In this case, the TRM transmitter (5) will operate at the on-off time ratio of 5-10 for each radiating element, i.e. it will operate totally already for 20-40% of time. When the transmitter operates for a radiating element, the receiver of this radiating element is blocked with the help of a circulator (7), while the receiver of the opposite radiating element continues to operate on reception, since it is not disturbed by the radiation in the opposite direction. In order to prevent the effect of reflected signals on the opposite open receiver, it is possible to emit in different directions at approximating but different frequencies and/or to use a different coding of signals, for example phase-shift signals.

In the RTM of the prior art there is only one phase shifter. In the case of using such TRMs in a phased array with a simultaneous operation for the reception and transmission, it is practically impossible to form two independent beams since the phase of the transmitted signal is identical to that of the received one. In this case, beams of similar direction relative to the perpendicular of each panel of radiating elements will be formed for the emission and the reception in opposite directions. At the same time, regular surveillance of the space takes more time than in the use of a TRM of the device according to the present invention with two phase shifters. If, for example, an impulse was transmitted from one panel, the TRM of the prior art commutes the transmitter to the other panel, and the first panel receiver starts receiving reflected signals. At this moment, the transmitter transmits an impulse from the second panel and immediately the reception of reflected signal at the second panel starts. Since there is only one phase shifter, both panels operate at the same phase. After the first panel receives the full signal, it starts standing since the second panel has not still received completely the signal because the impulse has been sent later, and it is prohibited to change the phase. Only after the complete reception of the signal at the second panel, the phase can be changed and the next impulse be transmitted in another direction. Considering that modern radars use rather long impulses, the time losses will be important at a regular surveillance. Furthermore, modern radar systems with electronic beam scanning are used not only for regular space surveillance. At the detection of a target, the beam interrupts the regular surveillance and additionally processes these targets. In the presence of dangerous targets, the operation time for them increases because of the regular surveillance time. For the time of operation with targets, the phased array having a TRM with one phase shifter, like in the prior art, looses completely its efficiency while operating simultaneously in the opposite direction, since, most probably, there is no target in the same direction from the other side of the array. In this case, when the TRM uses a device according to the present invention, the opposite panel can continue to carry out regular surveillance or to operate on targets independently of the first panel. That is why, the use of a TRM with one phase shifter results in losses of time and energy potential in case of regular surveillance and in additional losses while operating on targets, which significantly reduces the efficiency of the radar system, in particular when there are many targets, although such a situation needs precisely a high efficiency of the radar.

A phased array having a TRM with a single phase shifter, like in the prior art, is of low efficiency or is generally unusable for communications systems. Communications systems based on phased arrays are used to receive and to transmit data about specific targets located in known directions. While operating with a target from one side, it is unlikely to have another target from the other side in the same direction. In this case, the efficiency of the communications system will be extremely low, since when the operation on targets is carried out from one side, the other side will not operate at all. And in the case of using such a system as a repeater, it will not operate at all since it is necessary to continuously receive information from an object at one side and immediately to transmit this information to another object at the other side. It is extremely unlikely that the directions of these objects are the same.

Figure 5:
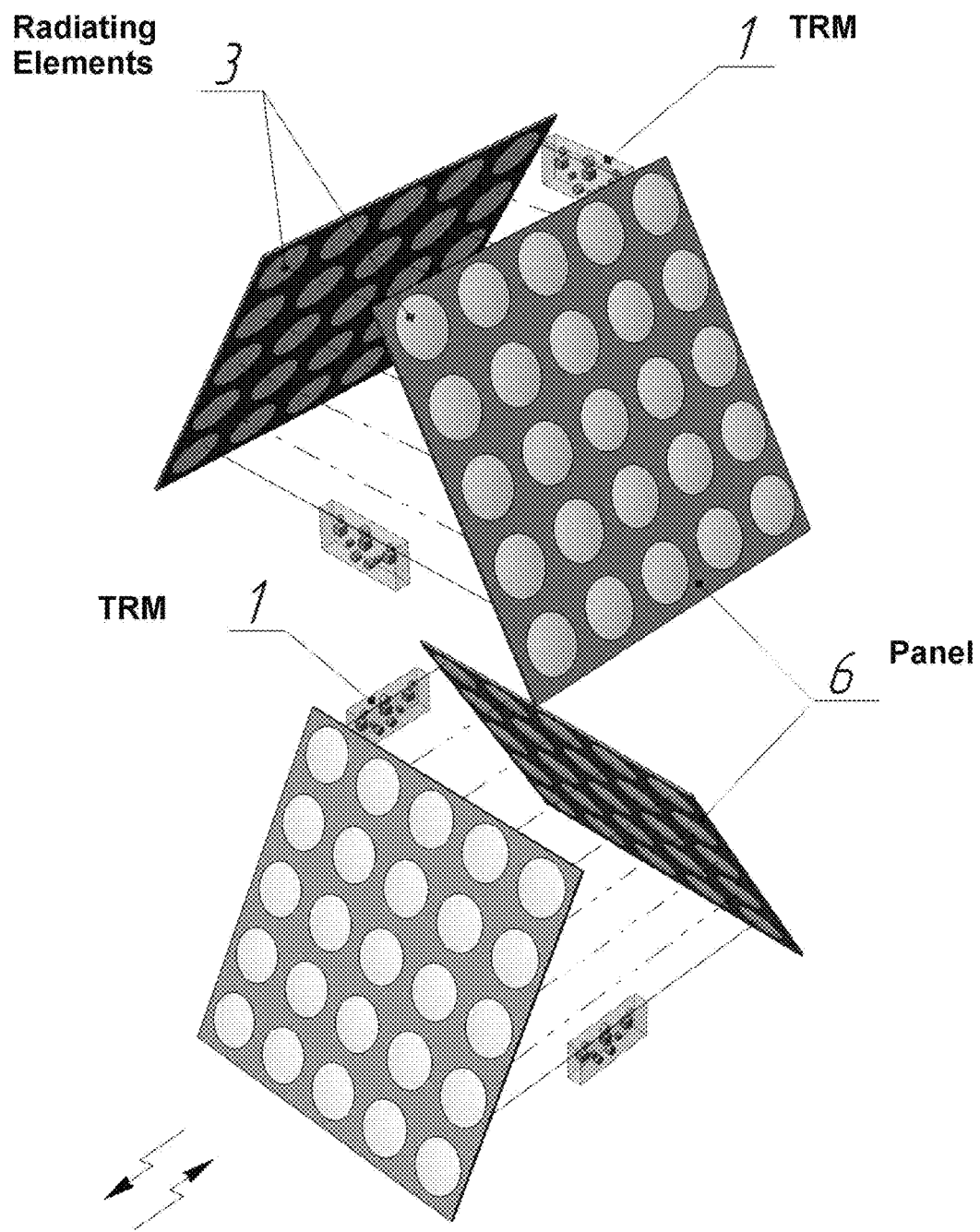
FIG. 5 shows a general view of two two-dimensional APAs with panels arranged at an angle, that provide for 360° scanning in the horizontal plane and for scanning up to 90° from the horizon in the vertical plane, where 1 represents a TRM, 3 represents radiating elements, 6 represents APAs panels, 11 represents a housing.

When four APAs are used in traditional radars with the all-around looking, separate APAs' panels, as a rule, are not mounted vertical but at an angle to the horizon. It is made with a view to increase the radar looking in the vertical plane. When separate APA panels are mounted at the angle of 30° to the horizon and when the scanning in the vertical plane is ±45-60°, the radar has the looking of 75-90° in the vertical plane from the horizon, i.e. it covers the whole hemisphere. The prior art presents only the parallel arrangement of the panels in the vertical plane, which is an evident drawback of the device, since a large blind looking zone of 60-90° appears in the upper and/or lower looking hemisphere. For compensating this drawback, the device of the present invention for the upper hemisphere can be made as well with separate APA panels, for example, at an angle of 30° to the horizon, and, in this way, the whole looking in the vertical plane will cover all the upper hemisphere (see FIG. 5). But in this case, some problems related to losses can appear in the lower TRMs due to a rather high distance from the TRM to radiating elements. Another way to increase the looking area for preventing said drawback is the use of additional APAs.

Figure 6:
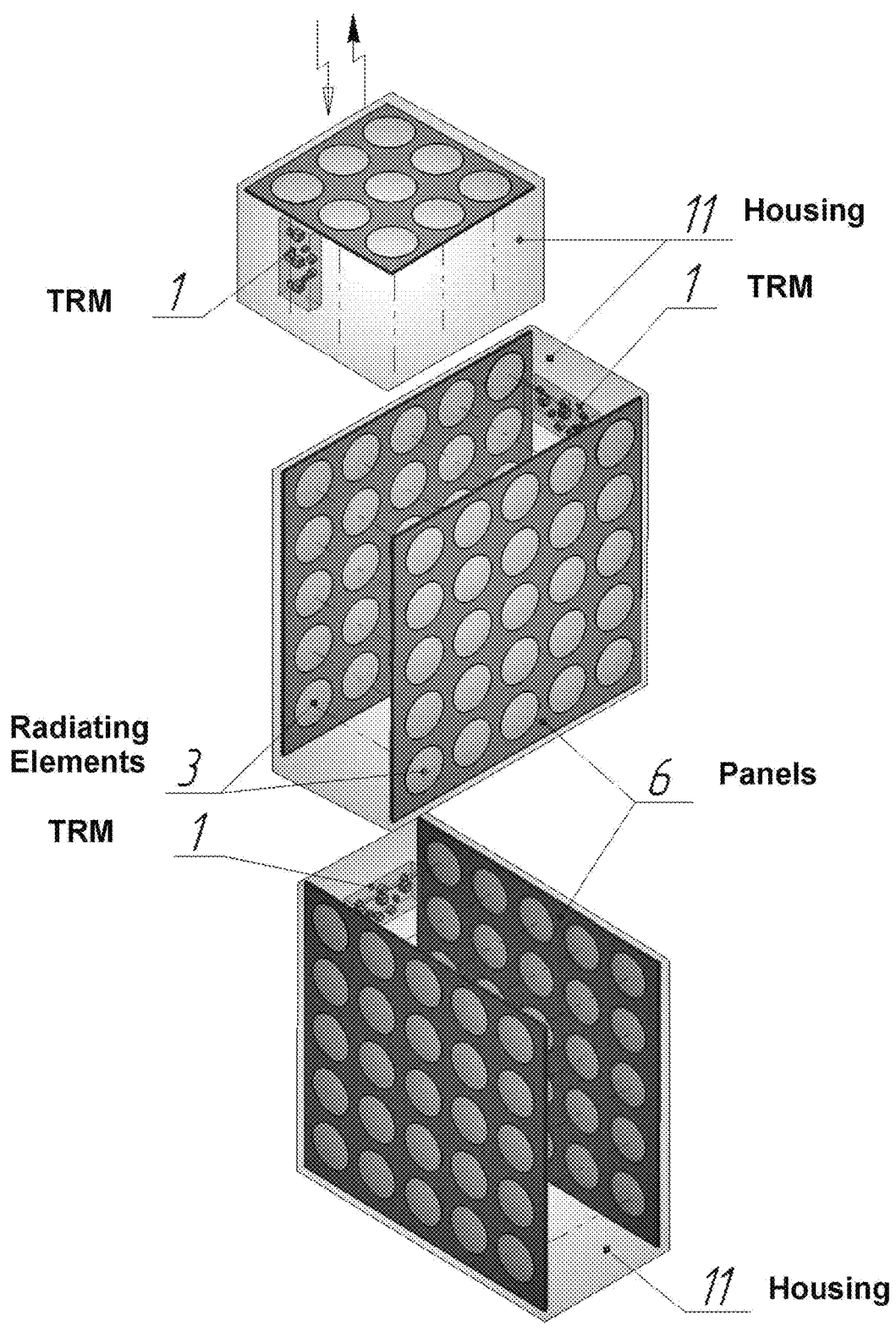
FIG. 6 shows a general view of the device with an additional two-dimensional one-sided APA having traditional TRMs, arranged with the possibility to radiate upwards, where 1 represents a TRM, 3 represents radiating elements, 6 represents APAs panels, 8 represents a panel of a unidimensional APA, 9 represents a TRM with one receiver and one phase shifter, 11 represents a housing.

At the location angle of 45° for a target, the distance to the same, even at the flight altitude of about 20 km, will be about 28 km, which is not very much. Detection of targets at such or lower distances can be provided by a single one-sided two-dimensional APA (8) composed of traditional TRMs having a low total energy potential, and mounted at the top in the way to emit in the upper looking sector (see FIG. 6). Such an APA must scan in two planes in the limits of ±45-60°. In this case, the total antenna pattern of such an APA will be presented as a part of a sphere with the aperture angle of 90-120° (±45-60°) which will enable to monitor completely the whole upper hemisphere with the radar system. As the need arises to illuminate the whole sphere, such APAs are mounted at the top and underneath.

Considering that the distances to targets in the upper and/or lower looking sectors are lower by a factor of 10 compared to the horizontal direction, such a two-dimensional APA can be composed of a significantly lower number of TRMs, for example 16 for 16 TRMs, which gives only 256 elements totally, nevertheless the antenna pattern of such an APA will be 8° by 8°, which will affect the radar system resolution in the upper and/or lower sectors, although the energy potential of such a radar system in these sectors will be quite sufficient. Totally, the radar system of the present invention, while using an upper one-sided APA, will have 6,256 TRMs, whereas a radar system with four traditional APAs has 12,000 TRMs.

Figure 7:
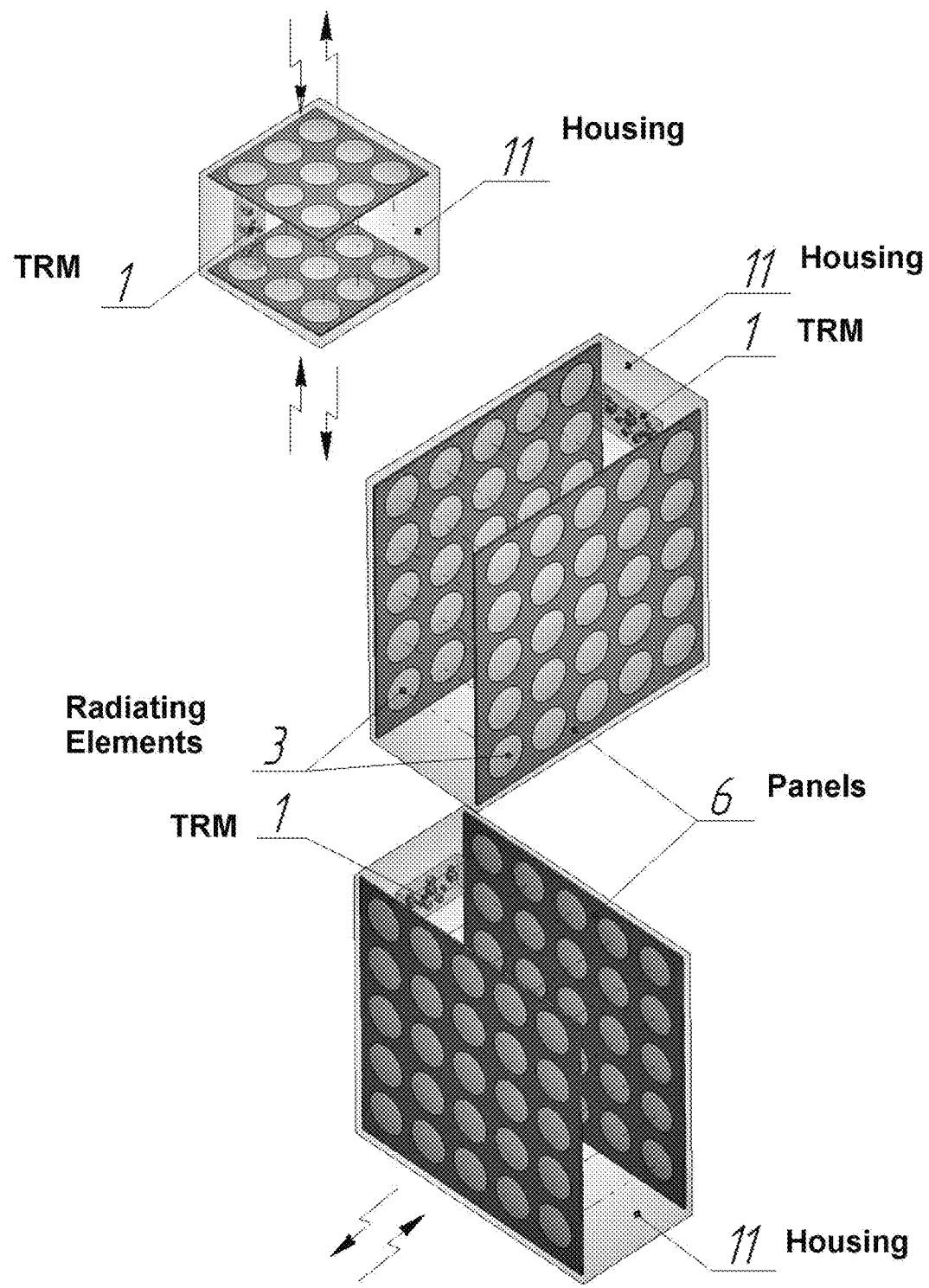
FIG. 7 shows a general view of the device with one additional two-dimensional APA with a TRM having a transmitting channel switch, two independent receivers and two independent phase shifters, arranged with a shift relative to the receiver-transmitter and with the capability to radiate upwards and downwards, where 1 represents a TRM, 3 represents radiating elements, 6 represents APAs panels, 11 represents a housing.

For obtaining a spherical looking area, a single two-dimensional two-sided APA can be used as well, having a TRM with a selector switch of the transmitter, two receivers and two phase shifters, mounted in the way to emit in the upper and lower looking sectors and having a shift in the horizontal and vertical planes relative to two perpendicular APAs, with the capability to take account of parallax mathematically (see FIG. 7). Then the radar system having a spherical looking area and an additional two-sided two-dimensional APA sized 16 by 16 TRMs will comprise 6,256 TRMs. A traditional design with a radar system composed of four APAs arranged at an angle to the horizon and of 12,000 TRMs shades the hemisphere and can not in general provide for a spherical looking area.

To cover the large blind area in the upper and/or lower looking sector of the device according to the present invention with two-dimensional two-sided APAs, use can be made not only of a two-dimensional one-sided APA mounted at the top and/or underneath, or a single two-dimensional two-sided APA with an upper and a lower looking sectors, but other radar structures carrying out the same functions, for example, a passive passed array, a structure with mechanical scanning, etc.

Figure 8:
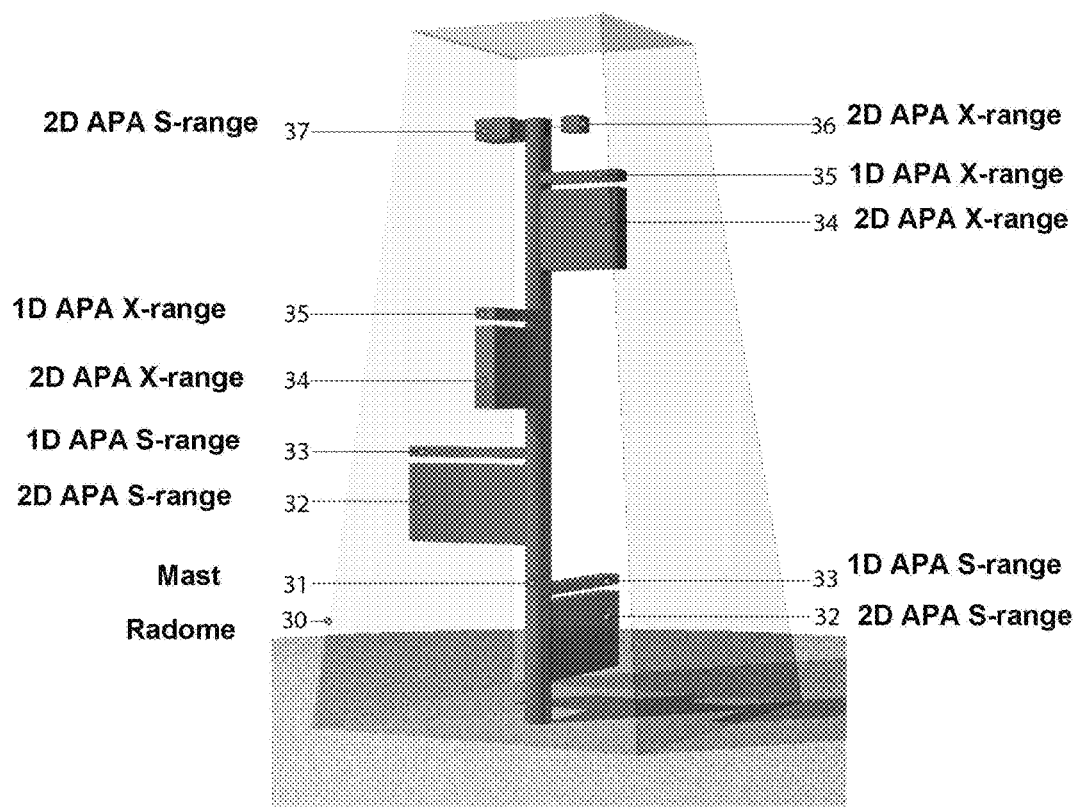
FIG. 8 shows an example of a general view of the receiver-transmitter for a radar-communication ship mast.

FIG. 8 discloses an example of building a ship radar-communication mast with the use of twosided unidimensional and two-dimensional APAs and of one-sided APAs to monitor the upper looking sectors. The ship radar-communication mast comprises a radioparent radome (30), a mast (31), two-sided two-dimensional APAs of a S-range radar (32), two-sided unidimensional APAs of S-range (33), two-sided two-dimensional APAs of a X-range radar (34), two-sided unidimensional APAs of a X-range communications system (35), one-sided two-dimensional APA of a X-range radar to monitor the upper looking sector (36) and a one-sided two-dimensional APA of an S-range radar to monitor the upper looking sector (37).

With the example of a ship radar-communication mast, one can easily observe that mounting of two independent radar systems and two independent communications systems in different ranges provides for a full-value all-around looking of each system without any shaded sectors formed by each other and by the mast, thanks to the shift of the two-sided arrays in the vertical and horizontal planes. Using structures like a rotary APA or structures in the form of a "Y" described in the prior art for such four systems will not create shaded sectors only in the system mounted on the top of a mast. The other three systems will have shaded sectors generated by the mast and/or by each other, which significantly affects the efficiency of a radar or communications system. Besides, the maximum scanning angle with the structure in the form of a <<Y>>, like in the prior art, will be ±30°. With higher scanning angles, shading by the neighboring array will occur.

The structures disclosed in the device according to the present invention can find efficient use in hydroacoustics where active phased arrays are used as well and where 2-time reducing of the number of TRMs is of current interest too.

INDUSTRIAL APPLICABILITY

The device according to the present invention can find application for radar, communications and hydroacoustic systems where APAs are used.

The invention claimed is:

1. A receiver-transmitter comprising:
active two-face phased arrays (APAs) comprising transmit-receive modules;
each transmit-receive module including two radiating elements, a transmitter, two receivers, and a first phase shifter;
the two-face phased arrays being one-dimensional or two-dimensional, and being arranged in the horizontal plane at an angle of 75-105° to each other while keeping the capability of looking all around;
each transmit-receive module being provided with a second phase shifter;
each respective one of the first and second phase shifters being permanently connected, via a respective first or second selector switches, to a respective one of the receivers or to the transmitter;
the transmitter being connected via a third selector switch to the radiating elements;
the active two-side phased arrays being shifted in relation to each other in the horizontal and/or vertical plane, and the receivers being coupled to the radiating elements.

2. A receiver-transmitter according to claim 1, each side of the active two-side phased array having panels, the panels of each side of the active two-side phased array being arranged at an angle to each other in the vertical plane.

3. A receiver-transmitter according to claim 1, additionally including at least one radar or communication station located upstream or downstream the receiver-transmitter, the radar or communication station having the capability to scan in two planes in order to radiate upwards and/or downwards.

4. A receiver-transmitter according to claim 3, wherein the radar or communication station is a two-dimensional active one-side phased array.

5. A receiver-transmitter according to claim 1, additionally including at least one radar or communication station located upstream the receiver-transmitter and at least one radar or communication downstream the receiver-transmitter, the radars or communication stations having the capability to scan in two planes in order to radiate upwards and/or downwards.

6. A receiver-transmitter according to claim 5, wherein the radars or communication stations are a two-dimensional active one-side phased array.

* * * * *